United States Patent [19]
McComber

[11] Patent Number: 6,119,800
[45] Date of Patent: Sep. 19, 2000

[54] DIRECT CURRENT ELECTRIC VEHICLE DRIVE

[75] Inventor: Donald R McComber, Littleton, Colo.

[73] Assignee: The Gates Corporation, Denver, Colo.

[21] Appl. No.: 08/902,562

[22] Filed: Jul. 29, 1997

[51] Int. Cl.[7] ................................................. B60K 1/00
[52] U.S. Cl. .................. 180/65.7; 180/65.1; 280/DIG. 5
[58] Field of Search .................... 180/65.1, 220, 180/315, 336; 280/DIG. 5; 474/69, 70

[56] References Cited

U.S. PATENT DOCUMENTS

| | | | |
|---|---|---|---|
| 3,108,481 | 10/1963 | Westmont | 74/220 |
| 3,202,234 | 8/1965 | Osborne | 180/65 |
| 3,858,674 | 1/1975 | Tabor | 180/65 R |
| 4,175,632 | 11/1979 | Lassanske | 180/65 R |
| 4,321,991 | 3/1982 | Teijido et al. | 192/0.034 |
| 4,391,156 | 7/1983 | Tibbals, Jr. | 74/336.5 |
| 4,691,148 | 9/1987 | Nicholls et al. | 318/12 |
| 4,871,343 | 10/1989 | Hattori | 474/11 |
| 5,182,968 | 2/1993 | Mott | 74/856 |
| 5,203,233 | 4/1993 | Hattori et al. | 74/865 |
| 5,343,128 | 8/1994 | Beltrame et al. | 318/3 |
| 5,355,749 | 10/1994 | Obara et al. | 477/20 |
| 5,489,003 | 2/1996 | Ohyama et al. | 180/65.6 |
| 5,797,816 | 8/1998 | Bostelmann | 474/14 |

FOREIGN PATENT DOCUMENTS 3323466  12/1983  Germany.

*Primary Examiner*—Brian L. Johnson
*Assistant Examiner*—Daniel Yeagley
*Attorney, Agent, or Firm*—C. H. Castleman, Esq.; S. G. Austin, Esq.; J. A. Thurnau, Esq.

[57] ABSTRACT

An improved electrically powered vehicle and associated method of the type having a mobile electrical storage device for providing electrical power electrically connected to a switching device, for selectively controlling the flow of electric power. The switching device is electrically connected to an electric motor. It selectively allows the flow of electrical power to the motor. The motor is mechanically connected to a belt type continuously variable transmission with the transmission mechanically connected to a drive wheel of the vehicle. It is improved by the motor, being of the direct current type, that is electrically connected to a continuously variable power supply control device responsive to an operator input. Further, the motor is mechanically connected to the continuously variable transmission, with the transmission adapted to respond to the rotational speed of the motor by varying in speed ratio.

11 Claims, 6 Drawing Sheets

DIRECT CURRENT ELECTRIC VEHICLE DRIVE

BACKGROUND OF THE INVENTION

1. Field of the Invention

The invention relates generally to extending the range of electrically powered vehicles, without compromising their power control characteristics. More particularly, this invention relates to an apparatus including a direct current (DC) electric motor coupled to a drive wheel via a continuously variable transmission. Specifically, the invention relates to the inclusion, of a belt type continuously variable transmission (CVT) coupled to a variable speed DC electric motor, as part of an electric storage powered vehicle, and a method for their use.

2. Description of the Prior Art

It has been recognized that there are desirable features to using electric motors to power land vehicles of many sizes and uses. That electric motors produce no gaseous emissions is among the desirable features. For electrically powered vehicles to be unconstrained, by constant connection to external electrical power sources and to have the freedom of movement of petroleum powered vehicles, electric vehicles must have self contained, or otherwise mobile, electric power storage. These are commonly in the form of on-board electric storage batteries. However, electric vehicles, having self contained electric power storage, still remained constrained by a useable range between recharges, of electrical power, that are commonly regarded as too limited.

The efforts to increase the range of such vehicles have included increasing the electrical energy storage capacity of the electrical storage devices or means, and improving the efficiency of the power drive of the vehicle. One effort, at improving power drive efficiency, has involved the use of alternating current (AC) motors. Designs for vehicles having such motors have included complex motor control systems that involve the conversion of the DC source of power, from the electric storage device, to AC, and varying the alternating frequency of the converted power to vary the speed of rotational fields within the AC motor. Not only are such variable rotational field control systems relatively complex, they also introduce additional energy loss into the power system of the vehicle, reducing overall efficiency.

U.S. Pat. No. 5,355,749 discloses the use of a variable rotational field control system. It further discloses the use of a belt type CVT, between the output shaft of the motor and a drive wheel of the vehicle. The variable rotational control system controls the input to the motor. While, the CVT controls the load imposed upon the motor. In this manner a target operational pattern for the motor is approached, toward the goal of improving the efficiency of the power drive system.

Another effort has used a DC motor coupled to a belt type CVT. U.S. Pat. No. 3,202,234 discloses the use of a shunt wound DC motor coupled to a drive wheel, via a CVT, where the CVT also performs a clutching function.

A common configuration for a belt type CVT, well known in the art, involves two pulleys, a driver pulley connected to the mechanical power source and a driven pulley connected to the load. Each pulley has opposing faces angled to the axis of rotation in a manner that supports the working surfaces of a power transmission V-belt with a trapezoidal cross section. The belt resides between the two faces at a radius from the axis of rotation defined by the point at which the width of the belt fills the gap between the two halves. The two faces are moveable toward or away from each other and thereby affect the size of the gap and thus the radius. The combination of the two radii and separation of the pulleys correspond to the length of the belt. Since the separation is fixed, as one radius is shortened the other must correspondingly be lengthened, and in such a manner as to maintain tension over the length of the belt. The ratio of each radius of the respective pulleys effects the speed ratio of the CVT. The speed ratio is the ratio of the output rotational speed to the input rotational speed.

In this reference it appears that the faces on the driver pulley are biased to be away from each other far enough that the width of the belt cannot bridge the gap. Accordingly, it acts as a clutch that allows the DC motor to spin freely such as at speed-no-load while the vehicle is a rest. When the operator desires to have the vehicle move, the operator depresses a throttle pedal which first causes the full electric storage device potential to be placed across the electrical input of the motor, causing it to accelerate toward speed-no-load. For as long as the throttle pedal is depressed any amount necessary to cause the vehicle to move, the full electrical potential is connected across the motor electrical input. Continued pedal depression causes the driver pulley faces to move toward each other, closing the gap, and squeezing the belt so as to establish tension upon the belt which leads to transmitting power to the belt.

In contrast, it appears that the faces of the driven pulley are biased toward each other for the most narrow gap available. Thus, at the point where tension is first placed upon the belt, the belt is finding a minimum radius at the driver pulley, and a maximum radius at the driven pulley, leading to a minimum speed ratio, or lowest gear ranges, for the CVT. Apparently, as additional pressure is placed upon the pedal, the gap for the driver pulley is further narrowed, causing the belt to be under additional tension, causing the bias in the driven pulley to be partially overcome, causing the gap for the driven pulley to widen, and ultimately leading to an increasing speed ratio or higher gear range. It appears that it is through this process, of going from a clutched condition, to a low speed ratio, and onto increasingly higher speed ratios, that the acceleration and speed of the vehicle is controlled. This process allows the shunt wound DC motor to accelerate the vehicle from a standing start without having to operate in the relatively inefficient condition of low rotational speed and high load. Further, it appears to allow the motor to generally avoid operation at low rotational speed with high load, when the vehicle is operated over flat and level surfaces.

However, the approach disclosed in "the '234" patent is fraught with difficulties and leaves other room for improvement from both efficiency of operation and flexibility of design stand points. The approach of the '234 patent does not appear to seek an optimum operational efficiency, but merely to avoid one operational condition that is particularly inefficient. Belt drives that are clutched in the disclosed manner tend to be unacceptably rough. There is apparently no way to maintain a constant vehicle speed, at speeds which are slower than would be produced by full motor rotational speed through the lowest speed ratio, without continuous slippage of the belt against the pulleys. This approach relies solely upon the use of a shunt wound motor. A series wound motor would be completely unsuitable, as it would go into an overspeed condition when allowed to experience full electric storage device potential with no load on the output shaft.

Further, it would appear that throttle operation is counterintuitive. Apparently, accelerating from a stop over a flat and level surface would be fairly ordinary, if the operator exercises a certain amount of restraint. The operator presses continuously farther on the pedal, to raise the speed ratio, which puts more load upon the motor, which causes the motor to draw more power from the electric storage device as its rotational speed is drawn down by the load. However, it also appears that, even in the flat and level situation, if the operator presses too suddenly upon the pedal, the speed ratio would rise more rapidly than the motor can accommodate and the rotational speed sinks into the operation region of low rotation speed and high load, that is sought to be avoided.

Of even greater concern, there appears to be at least one condition, commonly to be encountered, where throttle movement would actually be the reverse of what an operator would likely expect. If the vehicle approaches a positive incline at a throttle setting between minimum and maximum, an operator might normally expect to add additional pressure upon the throttle pedal to maintain adequate power to climb, at about constant speed. However, additional pressure for the approach of '234 causes the speed ratio to increase, motor speed to decrease and torque applied to the drive wheel to decrease, exacerbating the reduction of speed brought on by the presence of the incline. If taken to its limit one can reasonably expect the motor to be drawn down to a stalled or locked rotor condition. Only by reducing throttle pressure can the speed ratio be lowered to allow the motor to continue at the desired operating speed, and allow the vehicle to continue up the incline without stalling.

Accordingly, there remains the need to produce an electric vehicle drive that demonstrates improved efficiency, utilizing a DC motor to avoid motor control schemes that are relatively complex and introduce energy losses to the system, while not compromising the characteristics of smooth power application, flexibility of design, and intuitive throttle operation.

SUMMARY OF THE INVENTION

Accordingly, the present invention has as an object the provision of an electric vehicle drive that demonstrates improved efficiency, utilizing a DC motor to avoid motor control schemes that are relatively complex and introduce energy losses to the system, while not compromising the characteristics of smooth power application, flexibility of design, and intuitive throttle operation. To achieve the foregoing and other objects in an accordance with the purpose of the present invention, as embodied and broadly described herein, a direct current electric vehicle drive is disclosed herein. The instant invention is an improved electrically powered vehicle, and associated method of use, of the type having a mobile electrical storage means for providing electrical power electrically connected to a switching means, for selectively controlling the flow of electric power. The switching means is electrically connected to an electric motor. It selectively allows the flow of electrical power to the motor. The motor is mechanically connected to a belt type continuously variable transmission with the transmission mechanically connected to a drive wheel of the vehicle. It is improved by the motor, being of the direct current type, that is electrically connected to a continuously variable power supply control means responsive to an operator input. Further, the motor is mechanically connected to the continuously variable transmission, with the transmission adapted to respond to the rotational speed of the motor.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principals of the invention. In the drawings.

DETAILED DESCRIPTION OF THE PREFERRED EMBODIMENTS

Figure 1:
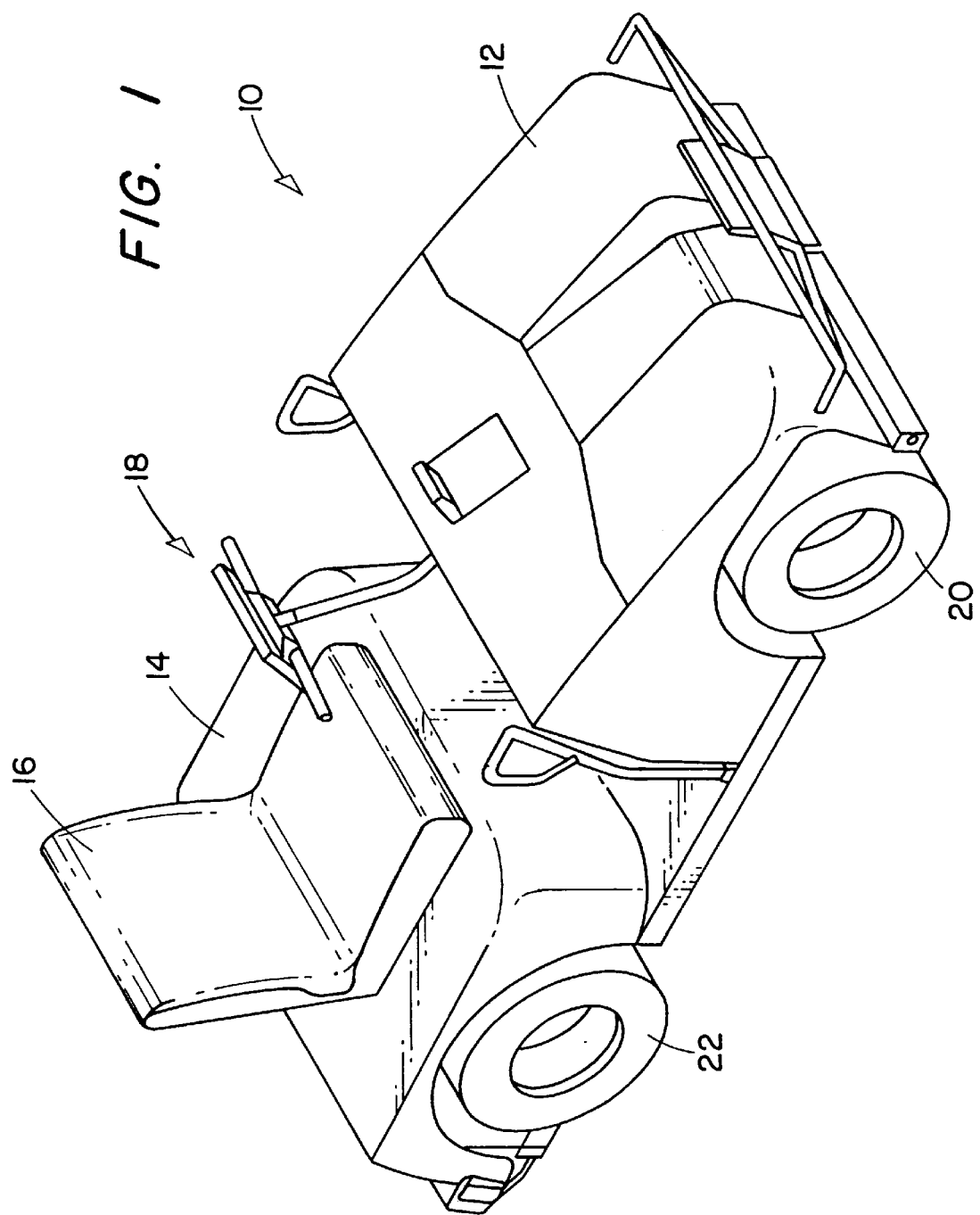
FIG. 1 is a schematic representation of an electrically powered vehicle, in perspective.
Figure 2:
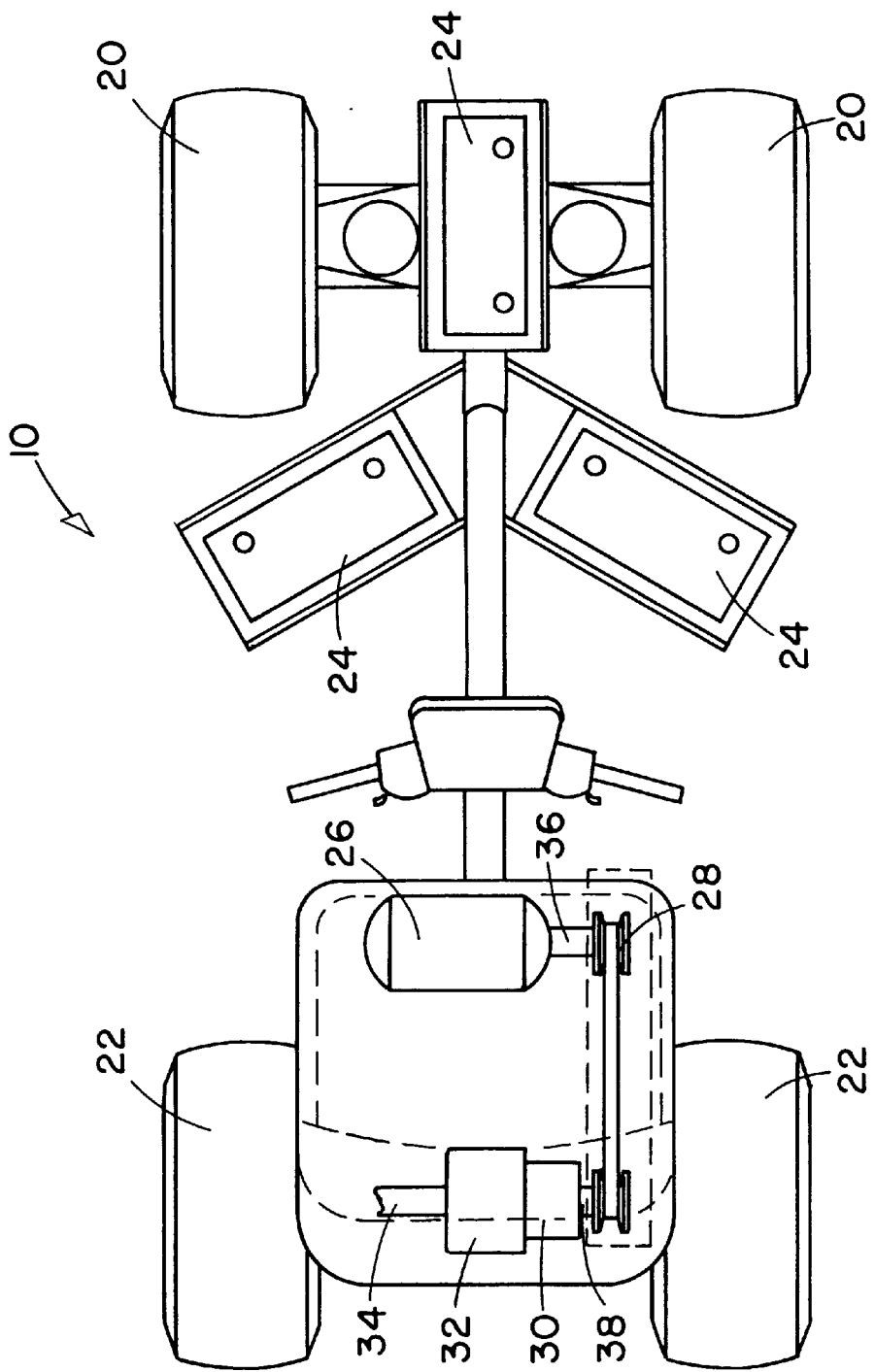
FIG. 2 is a schematic representation of an electrically powered vehicle, revealing pertinent features.

Referring to FIGS. 1 and 2 there is shown generally an electric power vehicle 10, that can be used for individual transportation or the transportation of various items. In this preferred embodiment, the vehicle is suited to perform the functions of a golf cart, versatile transportation for someone that has difficulty walking, or other uses involving only a single occupant. However, the instant invention is suitable for application to smaller vehicles, larger vehicles, vehicles carrying substantial weights and varying numbers of occupants, and on or off road.

Features schematically depicted include: forward body covering 12, which provides general environmental protection for a portion of the vehicle operator and other items of vehicle 10 under covering 12 and provides improved aesthetics; aft body covering 14, which also provides general environmental protection for the items covered and supports seat 16; seat 16, which is adapted for use by a single occupant; steering interface 18, which is adapted to be held by the vehicle operator, used in steering vehicle 10 and is mechanically connected to a steering mechanism for front steerable wheels 20 (the mechanical connection steering mechanism not shown), wheels 20 are non-driven wheels that provide support and steering; and drive wheels 22, which ultimately receive power from 2 horsepower series wound DC motor 26.

Figure 4:
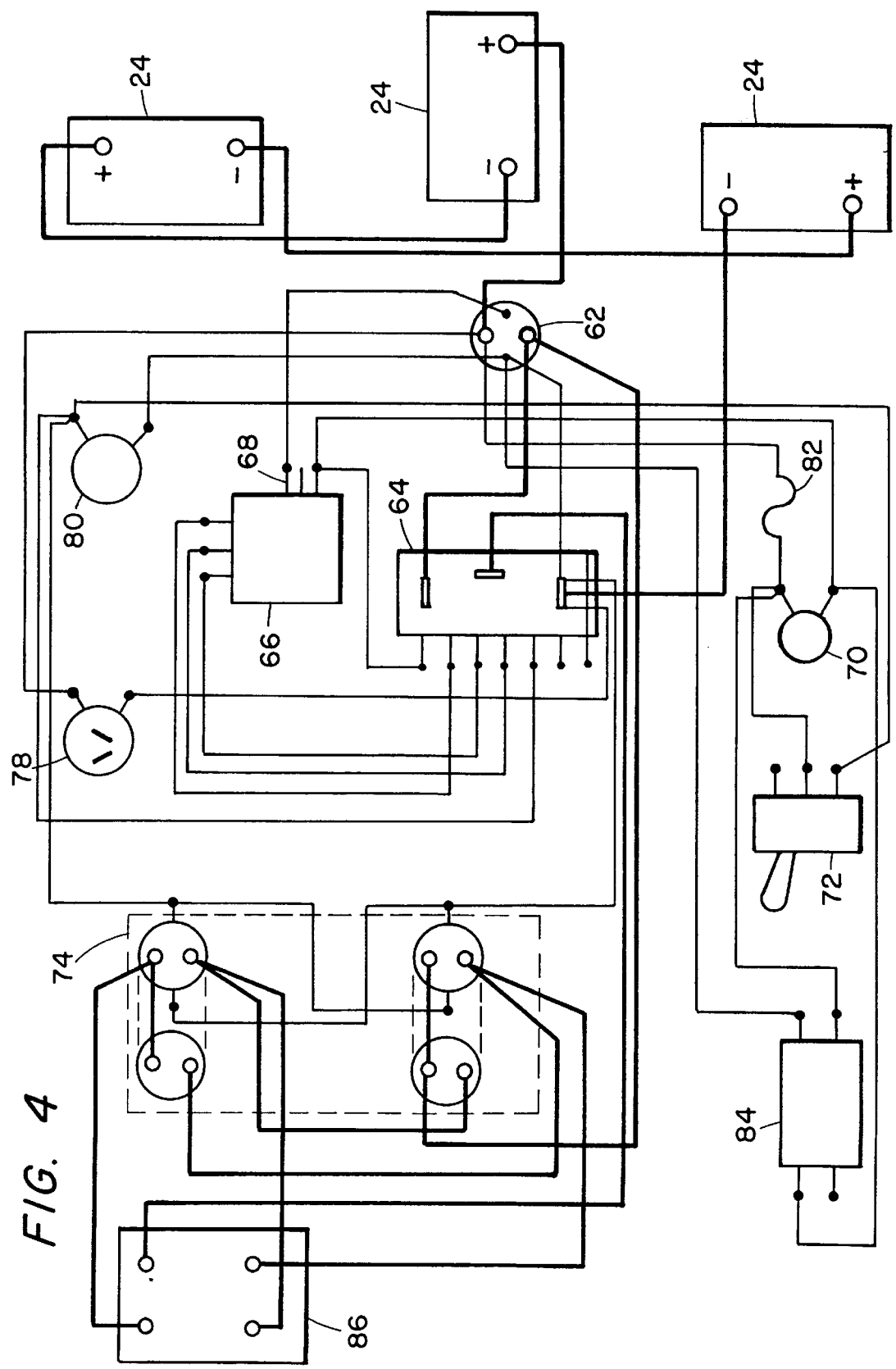
FIG. 4 is an electrical wiring diagram for a DC electric vehicle.

Now referring to FIG. 2 for those items not commonly depicted in FIG. 1, the same vehicle 10 is depicted schematically without forward and aft body coverings 12 and 14, revealing a 36 volt electric storage battery 24 having three twelve volt units, a DC electric motor 26, a belt type CVT 28, an intermediate drive reduction 30, a differential 32, and drive axle 34. Battery 24 supplies electrical power to motor 26 through electrical connection, as depicted in FIG. 4 and discussed later. Motor 26 transmits mechanical power to CVT 28 via motor shaft 36. CVT 28, in turn, transmits mechanical power to intermediate reduction drive 30 via CVT shaft 38, which, in turn mechanically communicates with differential drive 32. Differential shaft 34 delivers mechanical power from differential drive 32, that ultimately is delivered to drive wheels 22 through mechanisms not depicted. Any reasonable means known to those of ordinary skill in the art will suffice.

Figure 3:
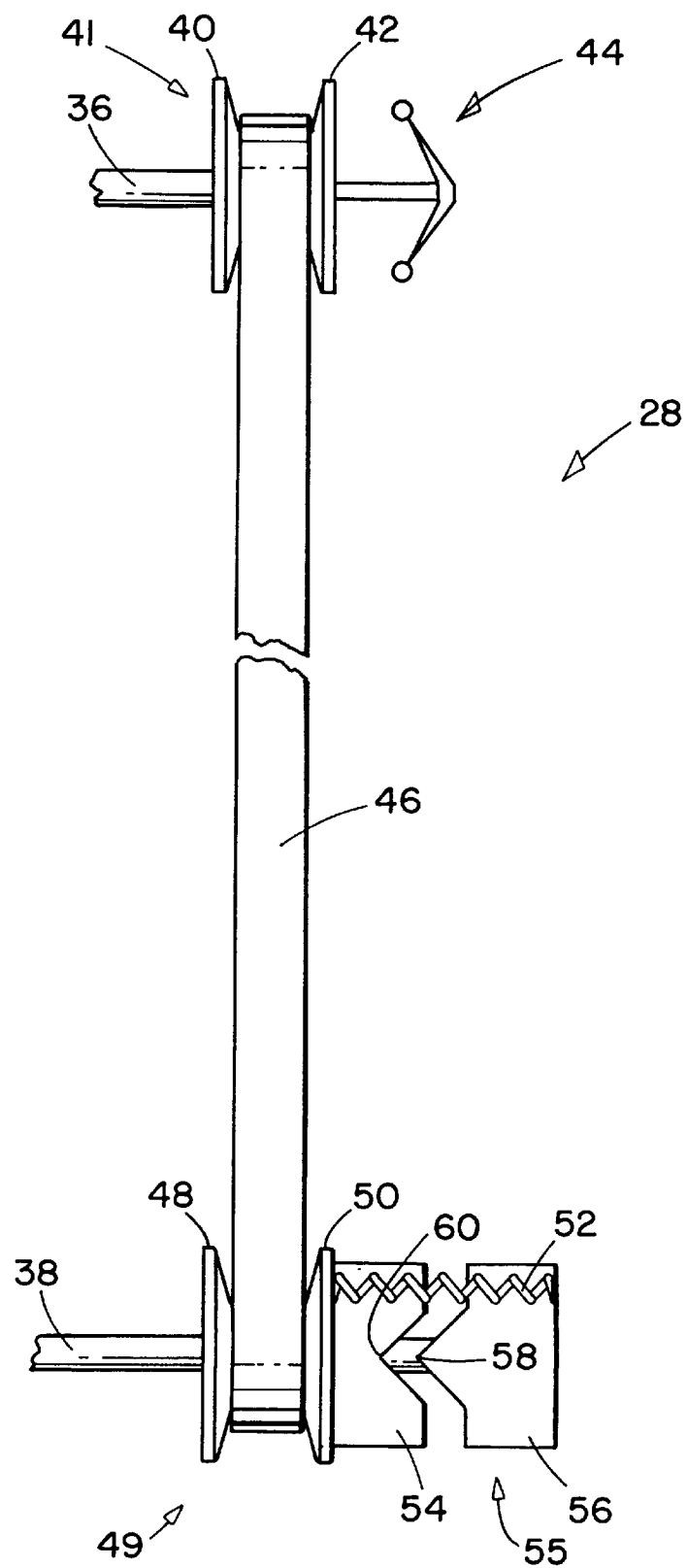
FIG. 3 is a schematic representation of a belt type continuously variable transmission.

CVT 28 is a belt type CVT of common construction, as discussed in "Discussion of Prior Art", supra., and depicted schematically in greater detail in FIG. 3. As can be seen, motor shaft 36 is in mechanical communication with inner and outer driver pulley portions 40 and 42, respectively, which form driver pulley 41 and, in turn, are in mechanical communication with fly weight control means 44. Fly weight control means 44 rotates at speeds equal to the rotational speeds of motor shaft 36.

Upon rotation, centrifugal force is communicated from fly weight control means 44 to driver pulley 41, leading to a squeezing force acting upon driver pulley portions 40 and 42 that tends bring them closer together. This squeezing force tends to cause power transmission belt 46 to ride on driver pulley 41 at a radius increasingly distant from the axis of rotation of driver pulley 41. As there is no other biasing that would tend to squeeze pulley 41 to a point more narrow than its maximum width, when there is no rotation of either motor shaft 36, driver pulley 41, and fly weight 44, driver pulleys portions 40 and 42 will be at maximum separation, and belt 46 will be on a radius minimum from the axis or rotation. With increased rotational speed comes increased biasing of pulley portions 40 and 42 toward each other an increased tendency for belt 46 to reside at a greater distance from the axis of driver pulley 41, and a contribution toward a higher speed ratio for CVT 28.

Through this process power is transmitted to belt 46 with a contribution toward varying speed ratios by driver pulley 41. Belt 46 then transmits this power to driven pulley 49, including inner and outer portions 48 and 50, respectively. Biasing spring 52 provides a biasing force that tends to force driven pulley portions 48 and 50 toward their minimum separation. This biasing arrangement has two major effects. First, by forcing belt 46 to reside at the maximum radius from the axis of driven pulley 49, belt 46 is urged into a longer path. When driver and driven pulleys 41 and 49, respectively, are properly spaced, this urging will provide tension upon belt 46. Second, by being flexibly biased, as opposed to rigidly mounted, as action of fly weight means 44 lengthens the radius at which belt 46 resides, from the axis of driver pulley 41, the separation of driven pulley portions 48 and 50 increases, resulting in the allowance of a path that coincides with the length of belt 46, and contributing a chance in speed ratio complementary to the change contributed by driver pulley 41.

Driver pulley 41 and driven pulley 49 should be spaced such that when belt 46 resides at the minimum radius from the axis of driver pulley 41, belt 46 resides at the maximum radius from the axis of driven pulley 49, while applying adequate tension upon belt 46 to avoid significant belt slippage during expected operating conditions.

Additional biasing of driven pulley portions 48 and 50 is provided by operation of torque ramp 55, including inner and outer portions 54 and 56. During operation of vehicle 10, torque is placed upon CVT shaft 38, by the combination of torque produced by motor 26 and load felt by drive wheels 22. This torque is placed across torque ramp 55 by the mechanical connection of CVT shaft 38 with outer ramp portion 56 and the mechanical connection of driven pulley 49 with inner ramp 54. As this torque is applied across torque ramp 55, interaction of torque ramp peak 58 and torque ramp valley 60 tends to force inner ramp portion 54 away from outer ramp portion 56, which, in turn, provides additional biasing complementary to biasing spring 52.

Now referring to FIG. 4, the bold lines indicate DC power connections. The lighter weight lines indicate control connections. Electric storage battery 24 supplies DC electrical power through electrical contactor 62. Motor control is provided by varying electrical potential via solid state motor controller 64 in conjunction with potentiometer 66, start switch 68, key switch 70, reversing switch 72, and reversing circuit 74. These are ultimately connected to DC motor terminals 86. There is also provided receptacle 78, by which recharging power can be supplied to the circuit, for recharging battery 24. Buzzer 80 is provided for safety to sound when reversing switch 72 is placed in a reverse position. Fuse 82 is a 5 ampere fuse to provide protection for the control circuitry. Fuel gauge 84 provides indication as to the state of charge of battery 24. Ultimately power is fed to DC motor terminals 86.

In operation the operator places both key switch 70 and start switch 68 in on positions, which engages contactor 62. For forward movement, reversing switch 72 is placed in its forward position. For rearward movement, reversing switch 72 is placed in its reverse position, at which point buzzer 80 will sound.

Figure 6:
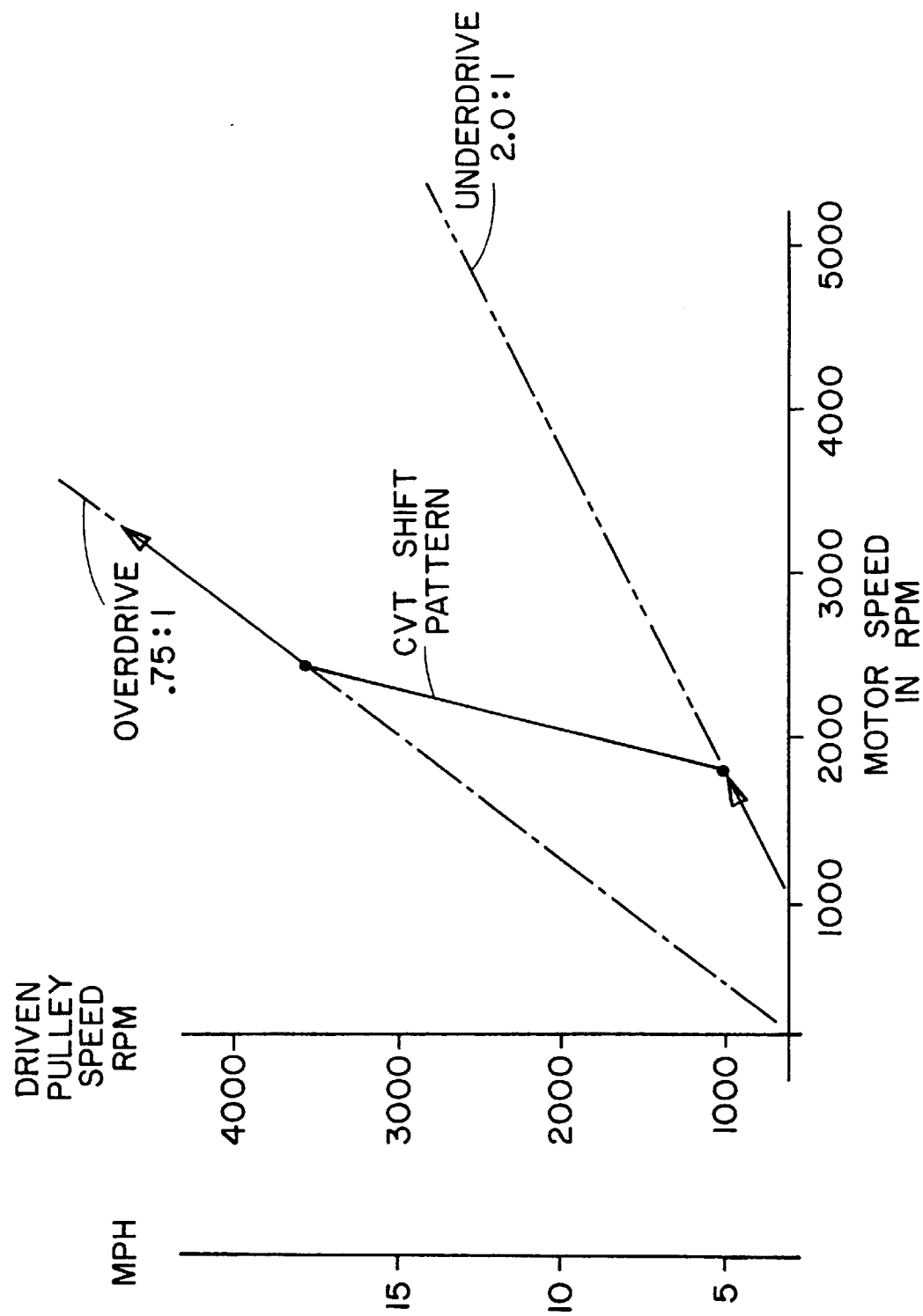
FIG. 6 is a graph illustrating belt type continuous variable transmission speed ratio operation.

To accelerate from a standing start, the operator causes a deflection of accelerator potentiometer 66, based upon the operator's requirement for acceleration, which provides a signal to motor controller 64. Controller 64 then supplies a commensurate quantity of electrical power to DC motor 26 through reversing circuit 74 and on to terminals 86. Initially the overall speed ratio from motor 26 through to drive wheels 22 will be the resultant of the combined speed ratios of reduction drive 30, differential 32, and final mechanical connection to drive wheels 22, further combined with the initial ratio for CVT 28 of 2.0:1, for a resultant of 20.5:1. As depicted in FIG. 6, until motor 26 reaches a speed of about 1800 r.p.m., there is no substantial change in this final drive speed ratio.

At about this point, the effect of fly weight 44 begins to cause the speed ratio of CVT 28 to rise toward its highest ratio of 0.75:1. At the same time torque ramp 55 responds to the torque placed across it because of torque produced by motor 26. This response is to increase the bias placed upon driven pulley 49 with an increase in torque. Any increased bias will tend to lower the speed ratio of CVT 28. These two effects are adjusting the load felt by motor 26, in response to the torque produced by motor 26, so as to control rotational speed toward the goal of causing motor 26 to operate in its optimum speed range.

Once the speed of vehicle 10 exceeds about 18 miles per hour, CVT 28 reaches its maximum speed ratio and can no longer increase load whereby it controls the speed of motor 26.

Figure 5:
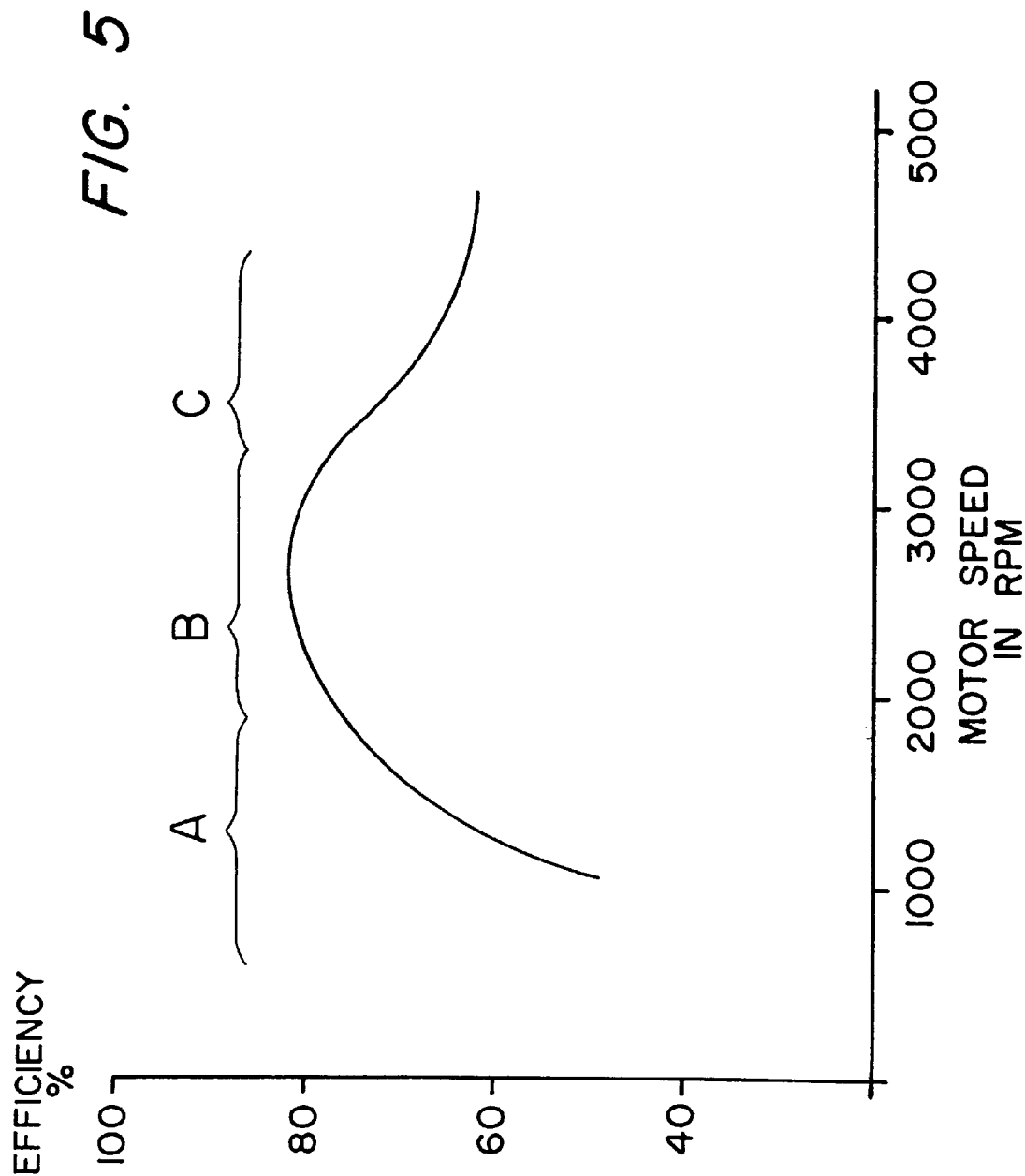
FIG. 5 is a generalized graph of a 2 horsepower series wound electrical motor.

It will be noted that three regions of operation of CVT 28 have been identified. These are depicted in FIG. 5. FIG. 5 plots the approximate efficiency of a representative series wound DC motor against motor speed. The portion under the brace denoted a "A" corresponds to the region where CVT 28 is operating at its lowest speed ratio. Here CVT 28 is reducing the load upon motor 26 by multiplying torque to drive wheels 22 and facilitating rapid motor acceleration. This relatively rapid acceleration minimizes the time motor 26 spends in this operating region, of relatively low motor efficiency.

The portion under the brace denote "B" is what is defined herein as the optimum speed range, or the region encompassing that portion of the curve with the highest efficiency and to which operation of the motor can be reasonably confined. It is within this region that CVT 28 holds motor speed for vehicle 10 speeds of about 5 miles per hour to about 18 miles per hour.

The portion under the brace denoted "C" is where CVT 28, can no longer increase load to control motor speed, it multiplies drive wheel 22 speed to allow higher vehicle 10 speed.

Unlike the prior art, it is expected that this approach has the added advantage of improving motor efficiency for any type of DC motor applied to such vehicles. These include series wound, shunt wound, compound wound, and permanent magnet DC motors. Further, instead of simply seeking to avoid one region of poor efficiency, the instant invention forces motor operation toward the region of optimum efficiency, and without introducing undesirable power control features or the use of complex motor control systems.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. An improved method for operating a vehicle with a combination, of a continuously variable transmission and an electric motor, powered by a mobile electrical storage device, with the steps of supplying electrical power to said combination from said storage device, transmitting mechanical power between said electric motor and a drive wheel of said vehicle, and varying a speed ratio between said electric motor and said drive wheel in a continuous manner, the improvement comprising:

supplying electrical potential for direct current to said motor, varying the amount of electrical potential supplied to said motor in a continuous manner, and varying a radial distance from axis of rotation a power transmission belt rides upon a pulley to vary said speed ratio between said electric motor and said drive wheel in a continuous manner in response to motor speed and in response to motor load by communication of a biasing arrangement.

2. The method of claim 1, the improvement further comprising said response to motor speed is by a driver pulley increasing said speed ratio upon sensing increasing motor speed.

3. The method of claim 2, the improvement further comprising said driver pulley increasing said speed ratio through action of fly weights.

4. The method of claim 1, the improvement further comprising said response to motor load is by a driven pulley decreasing said speed ratio upon sensing increasing motor load.

5. The method of claim 4, the improvement comprising said driven pulley decreasing said speed ratio through action of a torque ramp.

6. The improvement of claim 4 wherein said biasing arrangement includes fly weights adapted to vary a driver pulley width and thereby vary said speed ratio.

7. The vehicle of claim 6 further comprising:

said biasing arrangement including fly weights adapted to vary a driver pulley width and thereby vary said speed ratio.

8. The vehicle of claim 6 further comprising:

said biasing arrangement including a torque ramp adapted to vary a driven pulley width and thereby vary said speed ratio.

9. The improvement of claim 4 wherein said biasing arrangement includes a torque ramp to vary a driven pulley width and thereby vary said speed ratio.

10. An improved electrically powered vehicle of the type having a mobile electrical storage means for providing electrical power electrically connected to a switching means, for selectively controlling the flow of electric power, said switching means electrically connected to an electric motor to which said flow of electrical power selectively flows, said motor mechanically connected to a continuously variable transmission, and said transmission mechanically connected to a drive wheel of said vehicle, the improvement comprising:

said motor, being of the direct current type, electrically connected to a continuously variable power supply control means responsive to an operator input, and mechanically connected to a belt type continuously variable transmission, said transmission adapted to respond to rotational speed of said motor and adapted to respond to motor load by varying a speed ratio by communication of a biasing arrangement.

11. An electrically powered vehicle comprising:

a mobile electrical storage device for providing electrical power, said electric storage device electrically connected to a continuously variable power supply control device responsive to an operator input, said power control device electrically connected to a direct current type of electric motor, said motor mechanically connected to a belt type continuously variable transmission, said transmission mechanically connected to a drive wheel of said vehicle, and said transmission adapted to respond to rotational speed of said motor by varying a speed ratio in response to motor speed and in response to motor load by communication of a biasing arrangement.

* * * * *